United States Patent [19]

Serlin

[11] 4,397,883

[45] Aug. 9, 1983

[54] ELECTROGRAPHIC RECORDING MATERIAL

[75] Inventor: Irving Serlin, Springfield, Mass.

[73] Assignee: Monsanto Company, St. Louis, Mo.

[21] Appl. No.: 218,868

[22] Filed: Dec. 22, 1980

[51] Int. Cl.$^3$ .................. B41M 5/00; G01D 15/34
[52] U.S. Cl. .................................. 427/14.1; 162/138; 346/135.1; 427/58; 427/121; 427/197; 428/323; 428/328; 428/330; 428/342; 428/511; 428/514; 428/522; 428/537
[58] Field of Search .................. 346/135.1, 153.1, 157; 427/121, 14.1, 58, 145, 197, 256, 288; 162/138; 428/323, 327, 331, 511, 514, 522, 537, 409, 328, 330, 341, 342, 521, 913

[56] References Cited

U.S. PATENT DOCUMENTS

| | | | |
|---|---|---|---|
| 3,110,621 | 11/1963 | Doggett et al. | 117/218 |
| 3,759,744 | 9/1973 | Schiesman | 117/218 |
| 3,956,571 | 5/1976 | Takao et al. | 428/513 |
| 4,167,602 | 9/1979 | Serlin | 427/121 |

*Primary Examiner*—Bruce H. Hess
*Attorney, Agent, or Firm*—R. Bruce Blance; William J. Farrington; Paul D. Matukaitis

[57] ABSTRACT

An electrographic recording material comprising a conductive paper support coated with an electrically insulating layer comprising an intimate blend of a vinyl ester interpolymer latex and up to 500 parts of an inert finely divided pigment per 100 parts by weight of latex interpolymer. The vinyl ester interpolymer comprises about 3 to about 7 weight percent of carboxylic acid groups supplied by an interpolymerized $C_4$–$C_{10}$ vinylene monobasic carboxylic acid monomer.

13 Claims, No Drawings

4,397,883

ELECTROGRAPHIC RECORDING MATERIAL

BACKGROUND OF THE INVENTION

1. Field of the Invention

This invention relates to an electrographic recording material adapted for use in electrographic printing processes and to a method of making and using such an electrographic recording material. More particularly, it relates to an electrographic recording material comprising a vinyl ester interpolymer latex in the electrically insulating layer.

2. Description of the Prior Art

In general electrographic recording processes involve forming a latent image upon an electrically insulating charge-retentive layer of an electrographic recording material by impressing an electric charge corresponding to an original pattern and treating or developing the latent image by applying to the charge-retentive layer a colored resinous powder or toner which clings to the charged areas but which does not adhere to the uncharged areas. The developed image is then fixed by application of heat and/or pressure to the electrographic recording material to fuse the toner particles to the charge-retentive layer and form a permanent visible image. The electrographic recording material comprises an electroconductive sheet support coated with the electrically insulating charge-retentive layer comprising an electrically insulating polymeric binder and optionally a pigment or filler. The sheet support is generally paper which has been treated with ionic salts or polymers to provide electroconductivity.

Vinyl acetate interpolymers have been widely used as the electrically insulating polymeric binder of the dielectric or electrically insulating charge-retentive layer of electrographic recording material. In the preparation of such electrographic recording material, the vinyl acetate interpolymers are usually applied from organic solvent solution. As a means of reducing solvent emissions, acid modified vinyl acetate interpolymers have been applied in aqueous ammoniacal solution. However the viscosity of such solutions has limited the application to low concentrations of interpolymer and the consequent need to drive off large amounts of water has created a process of manufacture with a very low energy efficiency. Attempts to increase the interpolymer concentration and reduce the viscosity problem have been made by means of latex interpolymers of vinyl acetate. In conventional latex polymerization, rather large quantities of emulsifier and protective colloid are required and as a result, dielectric coatings prepared from vinyl acetate interpolymer latices have exhibited poor charge retention especially under humid conditions and have given electrographic images of extremely low density.

SUMMARY OF THE INVENTION

According to this invention, there is provided an electrographic recording material comprising a conductive paper support coated on at least one side with an electrically insulating layer comprising an intimate blend of a vinyl ester interpolymer latex and up to 500 parts by weight of an inert finely divided pigment per 100 parts by weight of latex interpolymer wherein the interpolymer latex consists essentially of an acid-modified interpolymer of a $C_4$-$C_6$ vinyl ester and less than about 0.8 parts by weight of a protective colloid per 100 parts by weight of interpolymer and the vinyl ester interpolymer comprises from about 3 to about 7 weight percent of carboxylic acid groups supplied by an interpolymerized $C_4$-$C_{10}$ vinylene monobasic carboxylic acid monomer.

Other aspects of the invention are directed to a method of producing the electrographic recording material and to an electrographic recording method employing the electrographic recording material.

DETAILED DESCRIPTION OF THE INVENTION

The interpolymer of the latex of the present invention comprises an interpolymerized vinyl ester as the major constituent of the interpolymer. The vinyl ester is a $C_4$-$C_6$ vinyl ester selected from the group consisting of vinyl formate, vinyl acetate and vinyl propionate and mixtures thereof. Vinyl acetate is the preferred vinyl ester.

The vinyl ester interpolymer is modified with an interpolymerized $C_4$-$C_{10}$ vinylene monobasic carboxylic acid monomer of the formula:

$$RCH\!=\!CHCOOH$$

where R is a hydrocarbyl, hydrocarbyloxy or hydrocarbyloxycarbonyl group. Suitable acid monomers include crotonic acid, isocrotonic acid, 2-pentenoic acid, 2-decenoic acid, 3-methoxypropenoic acid, 3-hexoxypropenoic acid, 3-cyclohexoxypropenoic acid, methyl hydrogen maleate, methyl hydrogen fumarate, butyl hydrogen maleate and cyclohexyl hydrogen fumarate. The preferred acid monomers include crotonic acid, isocrotonic acid and methyl hydrogen maleate and of these crotonic acid is the more preferred. Sufficient acid monomer is interpolymerized with the vinyl ester to give a latex interpolymer comprising from about 3 to about 7 weight percent of carboxylic acid groups in the interpolymer and preferably from about 4 to about 6 weight percent carboxylic acid groups. When the concentration is less than about 3 weight percent, the stability of the latex is impaired and when it is more than about 7 weight percent, the charge retentiveness of coatings prepared from the latex is reduced.

The vinyl ester comprises at least about 60 weight percent of the interpolymer. In addition to the vinyl ester and vinylene monobasic carboxylic acid monomer, the interpolymers can comprise up to about 36 weight percent of a neutral vinyl monomer i.e. a vinyl monomer which contains neither acidic nor basic groups. Preferably the monomers of the interpolymer are selected to provide a glass transition temperature in the range of about 10° to about 50° C. and more preferably in the range of about 20° to about 40° C. Suitable optional monomers include acrylates such as methyl, ethyl and butyl acrylate, vinyl ethers, $C_7$-$C_{20}$ vinyl esters and vinyl pyrrolidone. Preferably the interpolymer comprises only the $C_4$-$C_6$ vinyl ester and the vinylene monobasic carboxylic acid monomer.

The aqueous latex of the interpolymer is obtained by a two-step process in which, first, the interpolymer is prepared by aqueous suspension polymerization in the presence of a limited amount of a suspending agent or protective colloid at a pH in the range of about 6.0 to about 6.2, and, second the interpolymer suspension is adjusted to a pH in the range of about 6.2 to about 7.5 and agitated to form the latex. Preferably the pH of the latex is no more than 7.0. The suspension polymerization is initiated at a suitable temperature with a free radical catalyst such as azobis(isobutyronitrile), benzoyl peroxide or a diacyl peroxide.

Suitable suspending agents or protective colloids for the suspension polymerization are water soluble. They include poly(vinyl alcohols), tragacanth gum, gelatin, ammonium salts of styrene maleic anhydride copolymers, ammonium salts of vinyl alkyl ether/maleic anhydride copolymers, polyethylene oxide graft copolymers, hydroxyethyl cellulose and starch. Among the preferred protective colloids are the poly(vinyl alcohols), especially those which are of moderate to high molecular weight and contain from about 10 to about 30 weight percent residual poly(vinyl acetate). Preferably the weight average molecular weight is at least about 80,000 and more preferably it is at least about 120,000. The amount of protective colloid used is no more than about 0.8 parts by weight and is preferably at least about 0.2 parts by weight per 100 parts by weight of interpolymer produced in the suspension polymerization step. Within this limitation, the amount selected is sufficient to provide a stable suspension polymer in the polymerization step and to provide a ready transition from interpolymer suspension to interpolymer latex at the second step. If insufficient protective colloid is present at the latex forming step, the interpolymer suspension forms an aqueous gel of extremely high viscosity and great difficulty is encountered in breaking up the gel to form the desired latex. In general within the range of protective colloid set forth above, the minimum amount required will tend to be higher when the molecular weight of the protective colloid and the concentration of acid co-monomer in the interpolymer are low, and vice versa.

The particle size of the suspension polymer is not critical, being dependent on the concentration of protective colloid and degree of agitation during the polymerization step. Generally the weight average particle size is in the range of about 5 to about 20 microns and is preferably at the lower end of the range to facilitate the break up of the particles and formation of the interpolymer latex when the pH is adjusted. The particle size of the latex can be in the range of about 0.05 to about 0.5 microns, depending on the amount of protective colloid present and the concentration of interpolymerized acid monomer. Preferably the particle size is in the range of about 0.08 to about 0.2 microns to provide a latex of low viscosity and adequate stability. The particle size is determined with the Coulter Electronic Nonosizer ® instrument.

The pH at the suspension polymerization step and at the latex forming step is controlled by the addition of a volatile base such as ammonia or a monobasic amine of boiling point less than 100° C. such as methylamine, dimethylamine, trimethylamine, ethylamine and triethylamine. The preferred base is ammonia since it is readily expelled from the latex interpolymer when the interpolymer is laid down as a coating. At the suspension polymerization step preferably at least about one tenth and no more than about 3 tenths of the stoichiometric quantity of base required for reaction with the acid component of the interpolymer is added incrementally during polymerization. Preferably the base is added in a delayed feed, with a portion of the acid monomer in aqueous solution, in an amount sufficient to dissolve the acid monomer in the aqueous feed. The amount of acid added incrementally and the program of addition are not critical. They can be determined by conventional means from the reactivity ratios of the acid, and the vinyl ester monomer. Similarly, the optional comonomers discussed herein above, may be added incrementally during polymerization, when there is a wide difference in polymerization reactivity between the optional comonomer and the vinyl ester. The amount of volatile base added at the latex formation step is sufficient to adjust the pH to the range of about 6.2 to about 7.5 and is preferably sufficient to adjust the pH to the range of about 6.5 to about 7.0. The total volatile base to achieve this pH range is generally about 0.6 to about 0.80 of the stoichiometric quantity for reaction with the interpolymerized acid monomer.

Since the acid monomer tends to inhibit polymerization of the vinyl ester, the degree of conversion of the vinyl ester into polymer may be less than complete. Hence at the end of the suspension polymerization step, it is generally convenient to strip residual monomer by distillation or vaporization. At the same time water can also be removed to allow the solids content of the polymer suspension and hence of the latex prepared therefrom to be adjusted to the desired level. Generally the solids content is at least about 25 weight percent and is preferably at least about 30 weight percent. The solids content is at a level to provide a latex viscosity of less than about 50,000 cps at 25° C., more preferably less than about 10,000 cps and even more preferably less than about 1000 cps.

The molecular weight of the interpolymer can be controlled in conventional fashion by the concentration of initiator or by the addition of a chain transfer agent. The weight average molecular weight is preferably less than about 100,000 and more preferably less than about 50,000. When the molecular weight is above 100,000, the suspension polymer particles tend to swell and coalesce into an intractable gel when the pH is adjusted at the latex forming step.

The interpolymer latex may be used in surface coating applications, in paper coatings and in floor polishes to provide coatings which are resistant to humidity and water spotting but readily dissolved with alkali solutions. They may also be used advantageously at higher solids than the conventional aqueous ammoniacal solutions, to provide an electrically insulating polymeric binder of the dielectric or electrically insulating charge-retentive layer of electrographic recording materials containing no emulsifier and only a low level of protective colloid.

To provide the electrographic recording material, the polymer latex is applied to an electroconductive paper support to form a continuous film of polymer by means generally known in the art, such as by spray, brush, roller, wire-rod, doctor blade, air-brush and wiping techniques and the water is evaporated from the paper.

An inert non-photoconductive pigment may be added to the latex. A fine dispersion of the pigment can be obtained by conventional high shear mixing. Afterwards the viscosity can be adjusted by the addition of water. This depends, of course, on the nature of the coating system used. Suitable non-photoconductive pigments are organic as well as inorganic substances such as styrene interpolymers, silica, zinc sulfide, titanium dioxide, talcum, calcium carbonate, diatomaceous earth, barium sulfate and lithopone and mixtures thereof. Styrene interpolymers suitable for use as pigments are generally latex polymers of the kind used as opacifying pigments for paper. The grain size of the pigments should not exceed about 20 microns and preferably should be less than about 10 microns. Preference is given to pigments having a particle size of at most about 1 micron.

The presence of non-photoconductive pigments in the insulating layer of the electrographic recording material has many advantages. By the addition of pigments a more economical recording material can be obtained, a mat aspect can be given to the electrographic recording material and "tooth" or ability to be marked or written upon by pen or other marking means can be improved. The range of the amounts of pigments is rather large. Depending on particle size of the latex interpolymer, the viscosity and pH of the latex, the size of the pigment particles, and the intended use, 0.1 to 500 parts of pigment per 100 parts of insulating polymeric latex binder can be used. In order to obtain the advantages of the pigment, preferably from about 50 to about 200 parts of pigment per 100 parts by weight of polymer latex binder is used.

The amount or weight of insulating layer in the recording material should be sufficient to provide a uniform coating substantially free of defects which might impair the quality of the image reproduced on the insulating layer. The amount can be in the range of about 2 to about 20 g dry weight per sq.m. of recording material, preferably from about 4 to about 16 g. and even more preferably from about 6 to about 10 g/sq.m. However, smaller amounts may suffice if a sufficient electrostatic charge can be applied without the risk of breakdown. Thicker layers are less favorable because processing difficulties may arise during charging and development of the electrographic recording material.

The electroconductivity of normal paper is rather low, especially when the ambient humidity is low. Therefore, the electroconductivity of the paper support should be enhanced to obtain an appropriate electrographic recording material. This can be accomplished e.g. by the addition of salts such as potassium nitrate and/or conductive polymers to the wood pulp during the paper making. A favorable electroconductivity of the paper can also be obtained by impregnating the paper with solutions of salts and/or conductive polymers. Good results are obtained also with paper carrying on at least one side a conductive layer serving as an intermediate layer between the support and the insulating layer. This conductive layer may be composed of e.g. conductive polymers. Surface resistivity values in the range of about $1 \times 10^7$ to $1 \times 10^{10}$ ohm/sq. for the paper allow a normal charging of the insulating surface. Indeed, it should be taken into account, that the surface resistance values of the insulating layer, when measured in the same way, are normally much higher and will show values of $1 \times 10^{11}$ to $1 \times 10^{14}$ ohm/sq. or even more.

The electrographic recording material of the present invention can be used in an electrostatic printing apparatus wherein an electrostatic charge pattern is built up on the insulating layer by conventional means such as by moving the material in close contact with electroconductive styli or by transferring an electrostatic charge pattern from a photoconductive drum. The electrostatic latent charge pattern formed on the insulating layer can be developed according to techniques known in the art, e.g. by means of a two-component developer composed of a toner and a carrier material or by liquid electrophoretic development. The developed pattern is then made permanent or fixed by application of heat or pressure to fuse the toner to the insulating layer.

The invention is further described and illustrated in the following examples which should not be construed as limiting its scope. All parts and percentages are by weight unless otherwise indicated.

PREPARATION OF VINYL ACETATE CROTONIC ACID INTERPOLYMER LATEX

EXAMPLE 1

A solution of 0.96 parts of a polyvinyl alcohol of weight average molecular weight about 125,000 and containing about 21 weight percent of residual poly(vinyl acetate), (sold by Monsanto Co. under the tradename Gelvatol ® 20-90), in 338 parts of water is added to a kettle and 14.1 parts crotonic acid, 263 parts of vinyl acetate and 15.4 parts of an aqueous paste containing 78 percent benzoyl peroxide are added in sequence. The contents of the kettle are stirred with an agitator at a speed of 250 rpm for 15 minutes to dissolve the initiator in the vinyl acetate and to break up the vinyl acetate into fine droplets. The kettle is then heated to reflux and after 15 minutes of reflux an aqueous solution containing 28.8 parts of water, 3.3 parts of 28 percent ammonia and 7.5 parts of crotonic acid is added at a uniform rate over a period of 75 minutes. The batch is refluxed for 3 more hours with the temperature rising from the initial 65° C. to more than 95° C. and is then stripped of residual monomer by distillation of approximately 30 parts of a water vinyl acetate mixture containing 4.5 parts vinyl acetate. The temperature rises to more than 99° C. during the stripping step.

The suspension polymer thus obtained is maintained at 80° C., 209 parts of warm water are added and rapid agitation is begun. A dilute ammonia solution containing 8.4 parts of 28 percent ammonia and 10.1 parts of water is added at a constant rate over 5 minutes. Maximum agitation is maintained at 80° C. for 30 minutes. The batch is then cooled to 25°-30° C. The solids content is 29.5 percent, the pH is 6.5, the Brookfield viscosity is 75 cps. and the particle size of the latex measured with the Coulter Electronics Nanosizer ® instrument is 0.14 micron. The acid group content of the interpolymer is 4.43 percent and the weight average molecular weight determined by gel phase chromatography on a Waters Associates No. 1 instrument with a BX column, and a theoretical Q-factor of 34.4, is 32,000.

EXAMPLES 1-16

A series of vinyl acetate-crotonic acid interpolymers is prepared by the method of example 1 with variation in the following parameters; acid monomer content, polyvinyl alcohol content, the amount of ammonia added with crotonic acid during the suspension polymerization, and the amount of ammonia added for the final pH adjustment at the stage of latex formation. The results are presented in table 1. In examples 9, 10, 11 and 14, all the crotonic acid is added initially; however ammonia is added incrementally during the suspension polymerization step. In example 14, ammonia is also added to the initial polymerization mixture. Because of low conversion of vinyl acetate, the crotonic acid content of the interpolymer is generally abiout 15 percent higher than theoretical based on the crotonic acid charged to the reaction kettle.

The data for examples 1-9 show that the latex formation step occurs more easily when the crotonic acid is about 7.6 percent of the monomers, part of the crotonic acid being added in a delayed addition with some ammonia (examples 1, 2 and 3). Higher concentrations of polyvinyl alcohol favor rapid latex formation (examples 1, 2 and 3 vs 4, example 5 vs 6, example 7 vs 8). Excessive ammonia addition at the latex formation step creates high viscosity (examples 6 and 11 vs 10). When ammonia is added to the initial charge (example 15), the suspension polymer remains as swollen beads when additional ammonia is added and latex formation is attempted. When ammonia is omitted from the delayed feed (examples 14 and 16), and when the amount of ammonia added by delayed feed is reduced (example 12 vs 10) a gel is formed when latex formation is attempted. When the amount of ammonia in the delayed feed is high, the rate of suspension polymerization is low (example 13).

cps. After 5 days the viscosity is 120 cps and very slight settling has occurred.

TABLE 1

VINYL ACETATE CROTONIC ACID INTERPOLYMER LATICES

| Example | Crotonic Acid, % Monomers | PVOH phm | Ammonia 28% phm suspension polymer stage | latex stage | Latex solids % | Latex Viscosity cps | Latex Formation Step |
|---|---|---|---|---|---|---|---|
| 1 | 7.6 (8.7)$^a$ | 0.34 | 1.2 | 2.9 | 29.4 | 75 | Rapid |
| 2 | 7.6 (9.3) | 0.32 | 1.2 | 2.9 | 32.3 | 330 | Rapid |
| 3 | 7.6 (8.8) | 0.32 | 1.2 | 2.9 | 32.1 | 168 | Rapid |
| 4 | 7.4 | 0.22 | 0.5 | 3.1 | 33.5 | 375 | Slow |
| 5 | 6.5 | 0.32 | 0.6 | 5.4 | 35.2 | 1740 | Slow |
| 6 | 6.5 | 0.21 | 0.6 | 5.4 | 37.2 | >100,000 | V. Slow |
| 7 | 4.5 | 0.30 | 0.4 | 3.7 | 34.5 | 540 | Slow |
| 8 | 4.5 | 0.21 | 0.4 | 3.9 | 35.2 | >60,000 | Slow |
| 9 | 10.0 | 0.45 | 1.5 | 3.9 | 35.0 | >100,000 | Slow |
| 10 | 6.5$^b$ | 0.19 | 0.8 | 2.0 | 34.2 | 240 | Rapid |
| 11 | 6.5$^b$ | 0.21 | 0.8 | 9.0 | 31.7 | >100,000 | V. Slow |
| 12 | 6.5$^b$ | 0.21 | 0.4 | 3.0 | 35.8 | gel | V. Slow |
| 13 | 6.5$^b$ | 0.21 | 1.6 | 3.0 | 35.4 | 700$^d$ | |
| 14 | 6.5 | 0.26 | — | 3.5 | 35.0 | gel | — |
| 15 | 6.5 | 0.21 | 1.6$^c$ | 1.4 | — | swollen beads | — |
| 16 | 10.0$^b$ | 0.21 | — | 9.0 | — | gel | — |

$^a$( ) crotonic acid content for the final interpolymer latex.
$^b$all the crotonic acid is added initially
$^c$3 parts ammonia per hundred parts of monomer is added initially
$^d$suspension polymerization step is very slow.

EXAMPLE 16

A commercial vinyl acetate-crotonic acid interpolymer containing 4.7 weight percent interpolymerized crotonic acid, (2.46 weight percent of carboxylic acid groups) produced by suspension polymerization to form a bead product, is treated with 1 equivalent of dilute aqueous ammonia by adding the interpolymer to the aqueous ammonia at 60° C. The mixture is stirred for 30 minutes and cooled to room temperature. The pH of the mixture is 7.2. The beads swell but do not break up to form a latex. An additional 1 equivalent of dilute aqueous ammonia is added to the mixture to adjust the pH to 9.4. The swollen beads dissolve and form a solution of 202 cps viscosity of 25° C. and 15% solids.

PREPARATION OF ELECTROGRAPHIC RECORDING MATERIALS

EXAMPLE I

A uniform blend of 18.8 parts 80% solids barytes sold by Pfizer, Inc. under the tradename No. 1 Barytes, 92.6 parts of the interpolymer latex of example 2, 31.3 parts of a 48% solids plastic pigment sold by Monsanto under the tradename Lytron® 2501 latex, 4 parts of 5.6% ammonia and 35.1 parts of water is prepared by mixing the ingredients in a blender. The pH of the blend is 6.9, the solids content is 33 percent, and the viscosity is 90 cps. After 5 days the viscosity is 120 cps and very slight settling has occurred.

A base paper supplied by P. H. Glatfelter Co. under the tradename PF-500, is coated on one side with an electroconductive coating at a coating weight of 4.0 g/m and on the other side with the interpolymer bartyes blend at a coating weight of 8.0 g/m. The electroconductive coating comprises an electroconductive resin sold by Calgon Inc. under the tradename Calgon 261, a fine calcium carbonate sold by Chas. Pfizer & Sons Inc. under the tradename Albagloss, and a soluble starch sold by Penick and Ford, Ltd. under the tradename Penford Gum 290, in the weight ratio of 3.5:3.5:1. The coated paper is stored for 16 hours at 22° C. and 50 percent relative humidity and is printed at 50 percent relative humidity in a 900A Versatec printer using the MTE-15 Test Exerciser. The print density determined with the Welch Scientific Company's Densichron Instrument using the black filter and standardized against the Reflection Standard No. 2 at a density of 0.505 is 0.73. The printed paper is subjected to a smear test by rubbing it with a finger and is rated 8 on a scale of 1 to 10 where 1 indicates that substantially no smear, finger printing or smudging occurred, 5 indicates that some smear but little finger printing occurred and 10 indicates that substantial smear and finger printing occurred.

COMPARATIVE EXAMPLE I

A blend similar to the blend of example I is prepared with the commercial vinyl acetate-crotonic acid interpolymer of Example 16. Sufficient ammonia to provide a pH of 8.5 in the aqueous blend is necessary to provide a uniform dispersion of the interpolymer. The solids content is 32.7 percent and the initial viscosity is 150 cps. Rapid gelling occurs and a gelled pigment layer, about 15 percent of the volume of the original dispersion, settles out and is not easily redispersed.

A coating of the dispersion is made immediately after the dispersion is prepared. In the Versatec test, it provides a print density of 0.78 and a smear rating of 8.

EXAMPLES II-VII

Electrographic recording materials are prepared by the method of example I, with interpolymer latices of examples 3, 4, 5, 7, 9 and 10. The data are presented in Table 2.

TABLE 2

| | Versatec Print Tests | |
| --- | --- | --- |
| Example | Latex Example | Print Density |
| I | 2 | .73 |
| II | 3 | .75 |
| III | 4 | .68 |
| IV | 5 | .75 |
| V | 7 | .75 |
| VI | 9 | .84 |
| VII | 10 | .69 |

What is claimed is:

1. An electrographic recording material comprising a conductive paper support coated on at least one side with an electrically insulating layer comprising a dried intimate blend of an aqueous vinyl ester interpolymer latex and up to 500 parts by weight of a finely divided pigment per 100 parts by weight of interpolymer latex, wherein the aqueous interpolymer latex has a pH in the range of about 6.2 to about 7.5 and consists essentially of an acid modified interpolymer of a $C_4$-$C_6$ vinyl ester and a protective colloid, wherein the acid modified vinyl ester interpolymer comprises from about 3 to about 7 weight percent of carboxylic acid groups supplied by an interpolymerized $C_{14}$-$C_{10}$ vinylene monobasic carboxylic acid monomer of the formula RCH=CHCOOH where R is a hydrocarbyl, hydrocarbyloxy or hydrocarbyloxycarbonyl group and wherein the concentration of protective colloid is in the range of about 0.2 to about 0.8 parts by weight per 100 parts by weight of the interpolymer.

2. The electrographic recording material according to claim 1 wherein the protective colloid is a polyvinyl alcohol comprising from about 10 to about 30 weight percent of unhydrolyzed polyvinyl acetate.

3. The electrographic recording material according to claim 2, wherein the polyvinyl alcohol has a weight average molecular weight of at least about 80,000.

4. The electrographic recording material according to claim 1, 2 or 3 wherein the vinyl ester is vinyl acetate.

5. The electrographic recording material according the claim 4 wherein the vinylene monobasic carboxylic acid monomer is selected from the group consisting of crotonic acid, isocrotonic acid and methyl hydrogen maleate.

6. The electrographic recording material of claim 5 wherein the finely divided pigment is selected from the group consisting of silica, calcined clay, zinc sulfide, titanium dioxide, talcum, barium sulfate, calcium carbonate, lithopone, and diatomaceous earth.

7. The electrographic recording material of claim 5 wherein the coating weight of the insulating layer is in the range of about 2 to about 20 grams per square meter of recording material.

8. The electrographic recording material of claim 5 wherein the aqueous interpolymer latex is the product of agitation of an aqueous bead suspension of the interpolymer partly neutralized to a pH in the range of about 6.2 to about 7.5 with a volatile base, the aqueous bead suspension having been prepared by suspension polymerization of the interpolymer monomers in an aqueous sodium containing the protective colloid at a pH adjusted to the range of about 6.0 to about 6.2 by addition of a volatile base throughout the polymerization.

9. The electrographic recording material of claim 8 wherein the volatile base is selected from the group consisting of ammonia and monobasic amines of boiling point less than 100° C.

10. The electrographic recording material of claim 8 wherein the volatile base is ammonia and the pH of the latex is in the range of about 6.2 to about 7.0.

11. The electrographic recording material according to claim 4 wherein the finely divided pigment is selected from the group consisting of silica, calcined clay, zinc sulfide, titanium dioxide, talcum, barium sulfate, calcium carbonate, lithopone, and diatomaceous earth.

12. The electrographic recording material of claim 4 wherein the coating weight of the insulating layer is in the range of about 2 to about 20 grams per square meter of recording material.

13. A method of electrographic recording comprising forming an electrostatic charge pattern on an electrically insulting layer of an electrographic recording medium, developing the charge pattern by application of a toner and fixing the toner by heat or pressure, wherein the electrically insulating layer is formed from an intimate blend of an aqueous vinyl ester interpolymer latex and up to 500 parts by weight of a finely divided pigment per 100 parts by weight of interpolymer latex, wherein the interpolymer latex has a pH in the range of about 6.2 to about 7.5 and consists essentially of an acid modified interpolymer of a $C_4$-$C_6$ vinyl ester and a protective colloid, wherein the acid modified vinyl ester interpolymer comprises from about 3 to about 7 weight percent of carboxylic acid groups supplied by an interpolymerized $C_4$-$C_{10}$ vinylene monobasic carboxylic acid monomer of the formula RCH=CHCOOH where R is a hydrocarbyl, hydrocarbyloxy or hydrocarbyloxycarbonyl group and wherein the concentration of protective colloid is in the range of about 0.2 to about 0.8 parts by weight per 100 parts by weight of the interpolymer.

* * * * *